(12) United States Patent
Yi

(10) Patent No.: US 6,965,977 B2
(45) Date of Patent: Nov. 15, 2005

(54) TAMPER-RESISTANT METHOD AND DATA PROCESSING SYSTEM USING THE SAME

(75) Inventor: Kyung-Suk Yi, Yongin-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 287 days.

(21) Appl. No.: 10/397,742

(22) Filed: Mar. 26, 2003

(65) Prior Publication Data

US 2003/0204696 A1    Oct. 30, 2003

(30) Foreign Application Priority Data

Apr. 29, 2002    (KR)    ................................ 2002-23429

(51) Int. Cl.$^7$ ............................................ G06F 12/00
(52) U.S. Cl. ...................... 711/169; 711/163; 711/167; 713/194; 713/322; 365/233
(58) Field of Search ........................ 711/152, 167, 169, 711/163–164; 713/193–194, 200–202, 322; 365/233

(56) References Cited

U.S. PATENT DOCUMENTS

| 5,115,393 | A | * | 5/1992 | Kashiyama et al. | ........ 711/169 |
| 5,467,396 | A | | 11/1995 | Schossow et al. | .......... 713/193 |
| 5,475,855 | A | | 12/1995 | Uesugi | ........................ 712/216 |
| 5,808,961 | A | * | 9/1998 | Sawada | ....................... 365/233 |
| 6,606,707 | B1 | * | 8/2003 | Hirota et al. | ................ 713/172 |

FOREIGN PATENT DOCUMENTS

| JP | 61040652 | 2/1986 |
| JP | 63165936 | 7/1988 |

* cited by examiner

*Primary Examiner*—Nasser Moazzami
(74) *Attorney, Agent, or Firm*—F. Chau & Associates, LLC

(57) ABSTRACT

A tamper-resistant method for preventing tampering using a glitch attack and a data processing system using the same are provided. The method includes reading out a first data from a region of the memory assigned by an address; reading out a second data from the region of the memory assigned by the address; determining whether the first data is identical to the second data; and fetching by the processor either one of the first and second data when the first data is identical to the second data.

19 Claims, 4 Drawing Sheets

TAMPER-RESISTANT METHOD AND DATA PROCESSING SYSTEM USING THE SAME

This application claims priority to Korean Patent Application No. 2002-023429, filed on Apr. 29, 2002, the contents of which are herein incorporated by reference in their entirety.

FIELD OF THE INVENTION

The present invention relates generally to data processing systems, and, in particular, to a data processing system which is capable of preventing tampering by use of a glitch attack technique.

BACKGROUND OF THE INVENTION

Smart cards are electronic components that have been developed to help facilitate high volume consumer transactions. For example, smart cards are used to record the number of fares on a bus pass. When a consumer boards a bus, the smart card is placed in a smartcard reader and one credit is deducted from the consumer's account.

As a data processing system, a smart card stores information, e.g., personal, financial, etc., that requires protection from unauthorized access. For this reason, a principle purpose of a smart card is to secure data stored therein. If the data in the smart card is issued to unapproved persons, a user or a system manager may suffer considerable damage. Unapproved access of a smart card is called "tampering". Tampering techniques can be divided into four major attack techniques, that is, a microprobing technique, a software technique, an eavesdropping technique, and a fault generation technique.

The microprobing technique can be used to access a chip surface directly. The software attack technique uses the normal communication interface of a processor and exploits security vulnerabilities found in the protocols, cryptographic algorithms, or their implementation. The eavesdropping technique monitors, with high time resolution, analog characteristics of all supply and interface connections and any other electromagnetic radiation produced by a processor during a normal operation. The fault generation technique uses abnormal environment conditions to generate malfunctions in a processor that provide additional access. All microprobing techniques are invasive attacks. They require hours or weeks in a specialized laboratory and, in the process, they destroy the packaging. The other three techniques are non-invasive attacks.

As a non-invasive attack technique, a glitch attack technique attacks a smart card without permission by applying abnormal signals to an externally provided signal or a power supply voltage so that a smart card operates unpredictably. Particularly interesting commands that an attacker might want to replace with glitches are conditional jumps or the test instructions preceding them. They create a window of vulnerability in the processing stages of many security applications that often allows an attacker to bypass sophisticated cryptographic barriers by simply preventing the execution of the code that detects that an authentication attempt was unsuccessful. Instruction glitches can also be used to extend or reduce the runtime of loops.

In conclusion, data stored in a smart card as a data processing system can be tampered by the glitch attack technique.

SUMMARY OF THE INVENTION

A tamper-resistant method capable of preventing tampering using a glitch attack and a data processing system using the same are provided.

In accordance with one aspect of the present invention, there is provided a method for preventing tampering of a data processing system including a memory and a processor. The method comprises reading out a first data from a region of the memory assigned by an address; reading out a second data from the region of the memory assigned by the address; determining whether the first data is identical to the second data; and fetching by the processor either one of the first and second data when the first data is identical to the second data.

In this embodiment, when the first data is not identical to the second data, the processor fetches neither of the first and second data. When the processor operates in synchronization with an external clock signal, the first data and the second data are successively read out from the memory by the same address during one cycle of the external clock signal.

In accordance with another aspect of the present invention, there is provided a data processing system. The data processing system includes a processor core, a clock generating circuit, a memory, and a tamper-resistant circuit. The processor core generates an address in synchronization with a first clock signal, and the clock generating circuit generates a second clock signal in response to the first clock signal. A period of the first clock signal is N times longer than that of the second clock signal. The memory is operated in synchronization with the second clock signal, and outputs data in response to the address transferred from the processor core. The tamper-resistant circuit receives data outputted from the memory in response to the second clock signal, and compares data values received during one cycle of the first clock signal. Herein, the processor core loads data from the tamper-resistant circuit when data transferred to the tamper-resistant circuit during a first half period of the first clock signal is identical to data transferred therefrom during a second half period thereof.

In this embodiment, the tamper-resistant circuit generates a flag signal indicating whether data values received during one cycle of the first clock signal have the same value.

In this embodiment, the processor core selectively receives data from the tamper-resistant circuit in response to the flag signal.

In this embodiment, the processor core receives the data from the tamper-resistant circuit in response to the flag signal indicating that data values received during one cycle of the first clock signal are identical to each other.

In this embodiment, the processor core does not receive the data from the tamper-resistant circuit in response to the flag signal indicating that data values received during one cycle of the first clock signal are different.

In this embodiment, the tamper-resistant circuit comprises first and second buffers; a multiplexer for multiplexing data from the memory into the first and second buffers in response to the second clock signal; and a comparator for comparing outputs of the first and second buffers to generate the flag signal as a comparison result.

In this embodiment, the tamper-resistant circuit comprises a shift register for storing first and second data sequentially outputted from the memory during the first and second half periods of the first clock signal; and a comparator for comparing the first data and the second data from the shift register to generate the flag signal as a comparison result.

BRIEF DESCRIPTION OF THE DRAWINGS

A more complete appreciation of the present invention, and many of the attendant advantages thereof, will become readily apparent as the same becomes better understood by reference to the following detailed description when considered in conduction with the accompanying drawings in which like reference symbols indicate the same or similar components, wherein.

DETAILED DESCRIPTION OF PREFERRED EMBODIMENTS

Preferred embodiments of the present invention will be more fully described with reference to the attached drawings. The present invention will be described using an internal clock signal having a period which is two times shorter than that of an external clock signal. But, it is obvious that an internal clock signal may have a period being N times (where N is 3 or more) shorter than that of the external clock signal.

Figure 1:
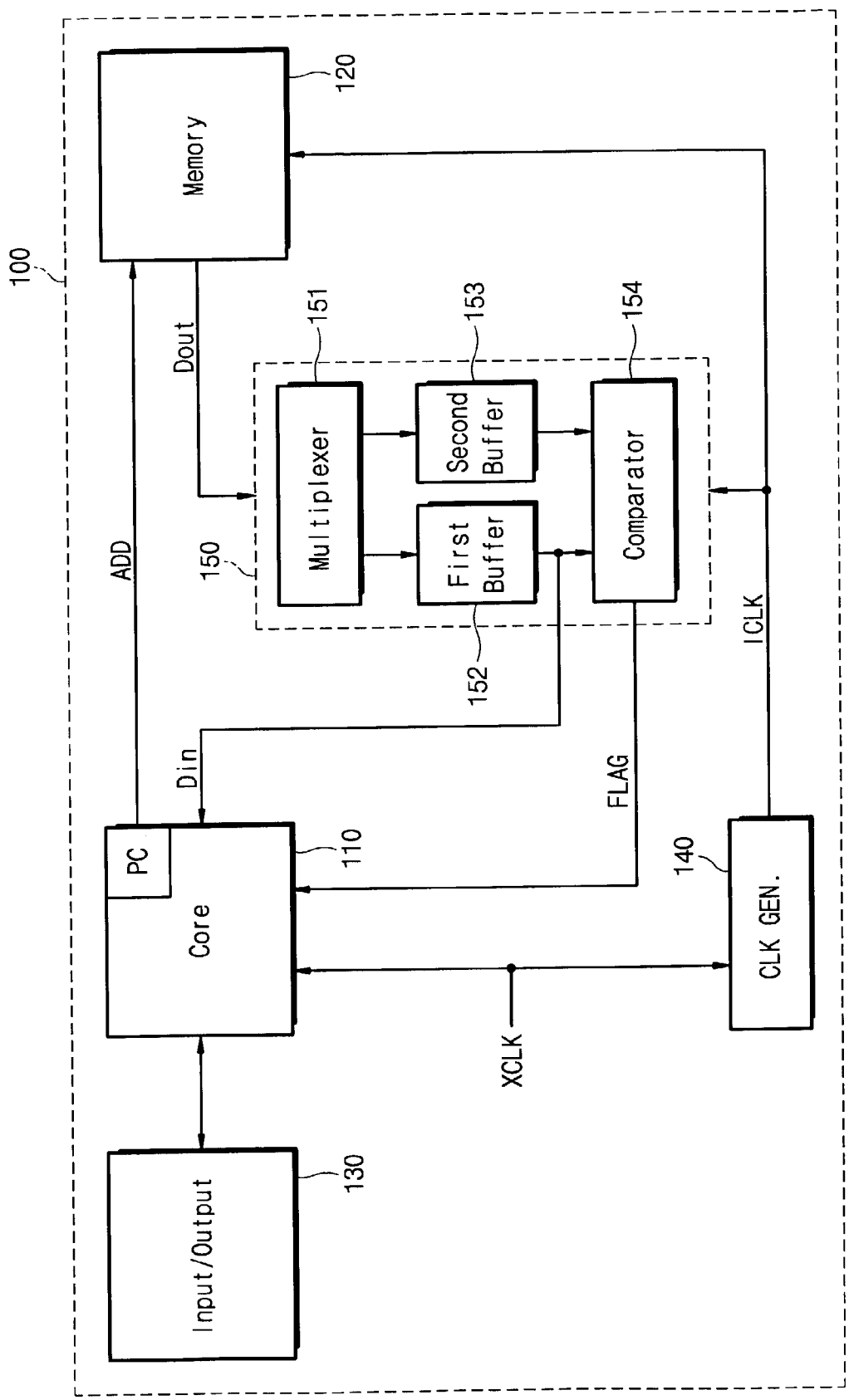
FIG. 1 is a block diagram of a data processing system according to a first embodiment of the present invention.

A block diagram of a data processing system according to a first embodiment is illustrated in FIG. 1. Referring to FIG. 1, a data processing system 100 according to the present invention comprises a core 110, a memory 120, an input/output device 130, a clock generating circuit 140, and a tamper-resistant circuit 150. Constituent elements of the data processing system 100 operate with a power supply voltage that is supplied external to the data processing system. As a processor, the core 110 communicates with an external device via the input/output device 130, and includes a program counter PC that generates an address ADD in synchronization with an external clock signal XCLK having a predetermined period. The address ADD is transferred to the memory 120 via an address bus.

Figure 2:
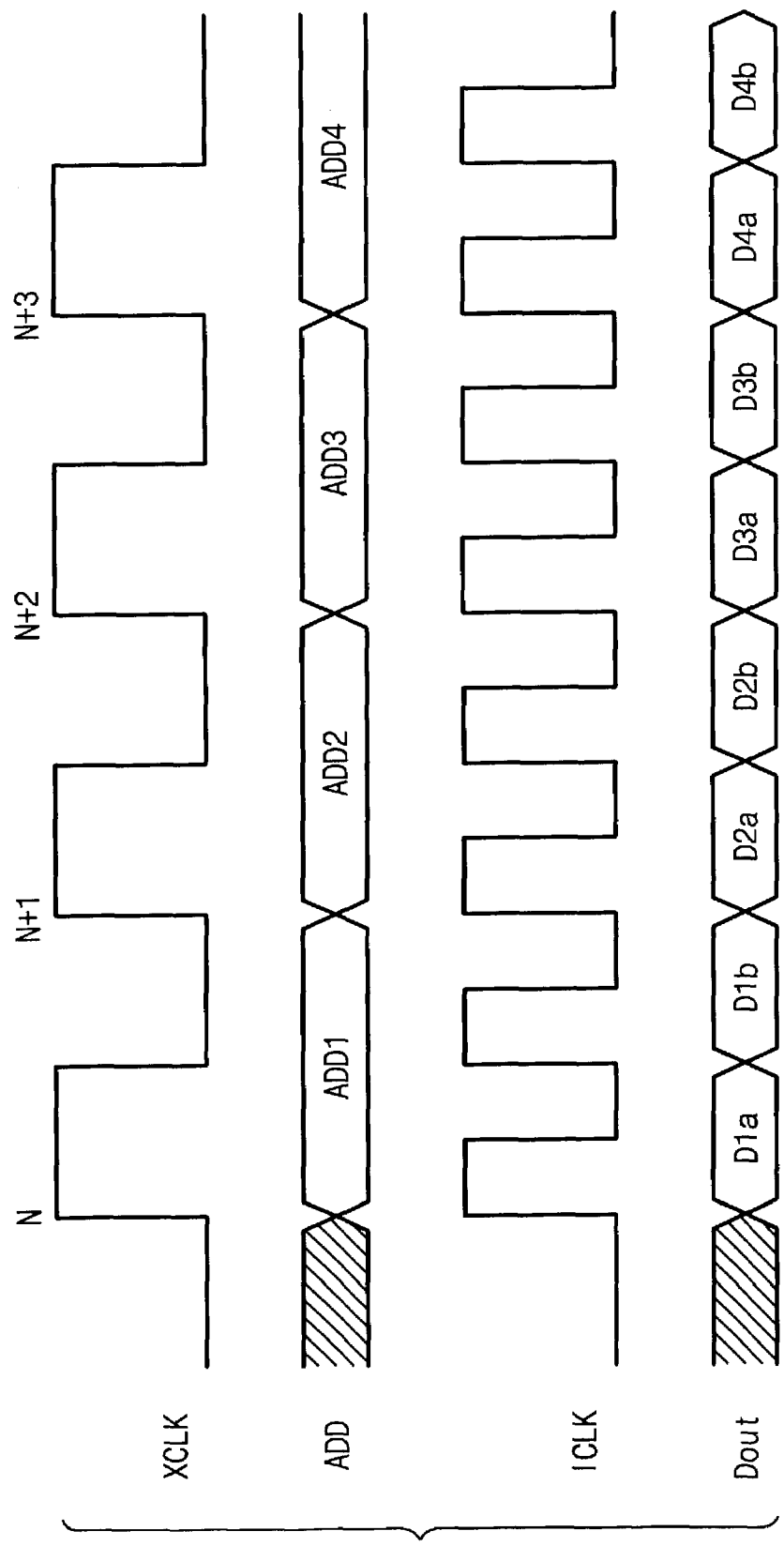
FIG. 2 shows a relationship between an external clock signal and an internal clock signal used in the data processing system of FIG. 1.

The clock generating circuit 140 receives the external clock signal XCLK to generate an internal clock signal ICLK. A period of the internal clock signal ICLK is equal to half a period of the external clock signal XCLK, as shown in FIG. 2. That is, two cycles of the internal clock signal ICLK are generated during one cycle of the external clock signal XCLK. The internal clock signal ICLK generated by the clock generating circuit 140 is supplied to the tamper-resistant circuit 150. The memory 120 is a non-volatile memory such as ROM, EEPROM, or flash EEPROM, or a volatile memory such as RAM. The memory 120 operates in synchronization with the internal clock signal ICLK from the clock generating circuit 140.

As seen from the above description, the core 110 operates in synchronization with the external clock signal XCLK, and the memory 120 operates in synchronization with the internal clock signal ICLK. This enables the memory 120 to perform a read/write operation twice when an address is inputted from the external. The program counter PC in the core 110 generates an address ADD in synchronization with the external clock signal XCLK. The memory 120 receives the address ADD in response to the external clock signal XCLK, and then performs its read/write operation. The memory 120 continuously carries out its read operation twice using the same address. That is, the memory 120 outputs data corresponding to the received address ADD in synchronization with the internal clock signal ICLK during one half period of the external clock signal XCLK, and then outputs data corresponding to the received address ADD in synchronization with the internal clock signal ICLK during the other half period of the external clock signal XCLK.

Continuing to refer to FIG. 1, data from the memory 120 is not transferred directly to the core 110, but to the core 110 via the tamper-resistant circuit 150. The tamper-resistant circuit 150 receives and temporarily stores first and second data continuously outputted from the memory 120 during one cycle of the external clock signal XCLK. Here, the first data and the second data are outputted by the same address. That is, the first data and the second data are continuously accessed from a place that is appointed by the same address. The tamper-resistant circuit 150 determines whether a value of the first data is identical to that of the second data. The tamper-resistant circuit 150 outputs a flag signal FLAG to the core 110. The flag signal FLAG indicates that the first data has the same value as the second data. The core 110 selectively fetches data temporarily stored in the tamper-resistant circuit 150 in response to the flag signal FLAG. For instance, if a value of the first data is different from that of the second data, the core 110 does not fetch currently accessed data, e.g., the temporarily stored data in the tamper-resistant circuit 150. If the first data has the same value as the second data, the core 110 fetches the currently accessed data, e.g., the temporarily stored data in the tamper-resistant circuit 150.

As illustrated in FIG. 1, the tamper-resistant circuit 150 comprises a multiplexer 151, a first buffer 152, a second buffer 153, and a comparator 154. The multiplexer 151 transfers data from the memory 120 respectively to the first and second buffers 152 and 153 in response to the internal clock signal ICLK. For instance, the multiplexer 151 transfers data, which is accessed during a high-level period of the external clock signal XCLK, to the first buffer 152 in response to the internal clock signal ICLK. The multiplexer 151 transfers data, which is accessed during a low-level period of the external clock signal XCLK, into the second buffer 152 in response to the internal clock signal ICLK. An output of the first buffer 152 is connected to the core 110. The comparator 154 compares an output (e.g., the first data) of the first buffer 152 with an output (e.g., the second data) of the second buffer 153 and then outputs the flag signal FLAG in response thereto. The flag signal FLAG indicates whether the first data has the same value as the second data.

Although not illustrated in FIG. 1, it is obvious that the multiplexer 151 uses the external clock signal XCLK instead of the internal clock signal ICLK. Alternatively, it is obvious that the multiplexer 151 uses both the external clock signal XCLK and the internal clock signal ICLK.

Figure 3:
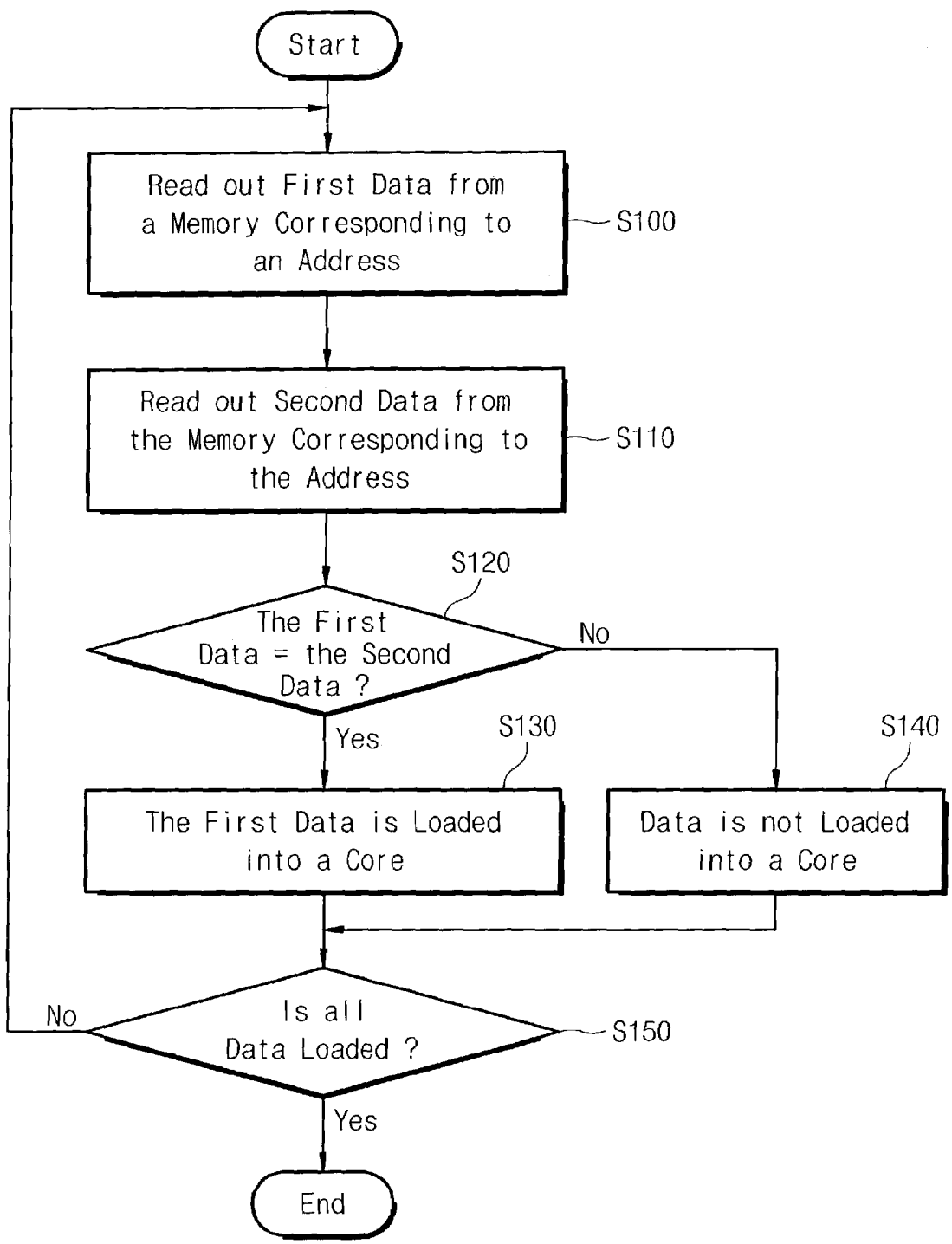
FIG. 3 is a flowchart for describing a tamper-resistant method according to an embodiment of the present invention.

FIG. 2 is a timing diagram of clock signals, an address, and data used in FIG. 1, and FIG. 3 is a flowchart for describing a read operation of a data processing system according to an embodiment of the present invention. A read operation of the data processing system will be more fully described with reference to the attached drawings.

To read out data stored in the memory 120, the program counter PC of the core 110 generates an address ADD1 in synchronization with an external clock signal XCLK. The address ADD1 thus generated is transferred to the memory 120. The memory 120 outputs data D1a corresponding to the address ADD1 in synchronization with an internal clock signal ICLK (S100). The outputted data D1a is temporarily stored in the first buffer 152 through the multiplexer 151. Then the memory 120 outputs data D1b of the address ADD1 once more in synchronization with the internal clock signal ICLK (S110). The outputted data D1b is temporarily stored in the second buffer 153 through the multiplexer 151.

The comparator 154 of the tamper-resistant circuit 150 determines whether the data D1a from the first buffer 152 is identical to the data D1b from the second buffer 153 (S120). The core 110 fetches the data D1a from the first buffer 152 in response to a flag signal FLAG from the comparator 154 (S130). That is, when the flag signal FLAG indicates that the data D1a is identical to the data D1b, the core 110 fetch the data D1a from the first buffer 152. On the other hand, when the flag signal FLAG indicates that the data D1a is not identical to the data D1b, the core 110 does not fetches the data D1a from the first buffer 152 (S140). After the steps S130 and S140, the core 110 determines whether all data is loaded (S150). If not, the procedure goes to the step S100. If so, the above read operation is completed.

In the case of the data processing system according to the present invention, a read operation is carried out twice during one cycle of the external clock signal XCLK. That is, data stored in the memory 120 is sequentially read out twice from a place that is appointed by the same address ADDi (i=1–4). In using the read method, it is possible to prevent the data processing system 100 from operating abnormally owing to a glitch attack forced to a power supply terminal.

As set forth above, the glitch attack is to apply to a power supply terminal a pulse signal that has a lower or higher level than a power supply voltage and a shorter period than that of the external clock signal XCLK. When the power supply voltage suffers from the glitch attack during a read operation, data read out from the memory 120 can be modified. Since a pulse signal used for the glitch attack has a shorter period than that of the external clock signal XCLK, the data processing system suffers from the glitch attack only during a high or low period of the external clock signal XCLK. For instance, assume that data modified by the glitch attack is data read out during the first period (a high-level period) of the external clock signal XCLK and the read data is temporarily stored in one buffer. Data is read out from the same place during the second period (a low-level period) of the external clock signal XCLK, and is stored in the other buffer. Since a read operation carried out during the second period of the external clock signal XCLK does not suffer from the glitch attack, the core 110 selectively fetches currently accessed data in accordance with a data comparison result. Accordingly, it is possible to prevent malfunction of the data processing system 100 owing to the glitch attack that is forced to the power supply terminal.

Figure 4:
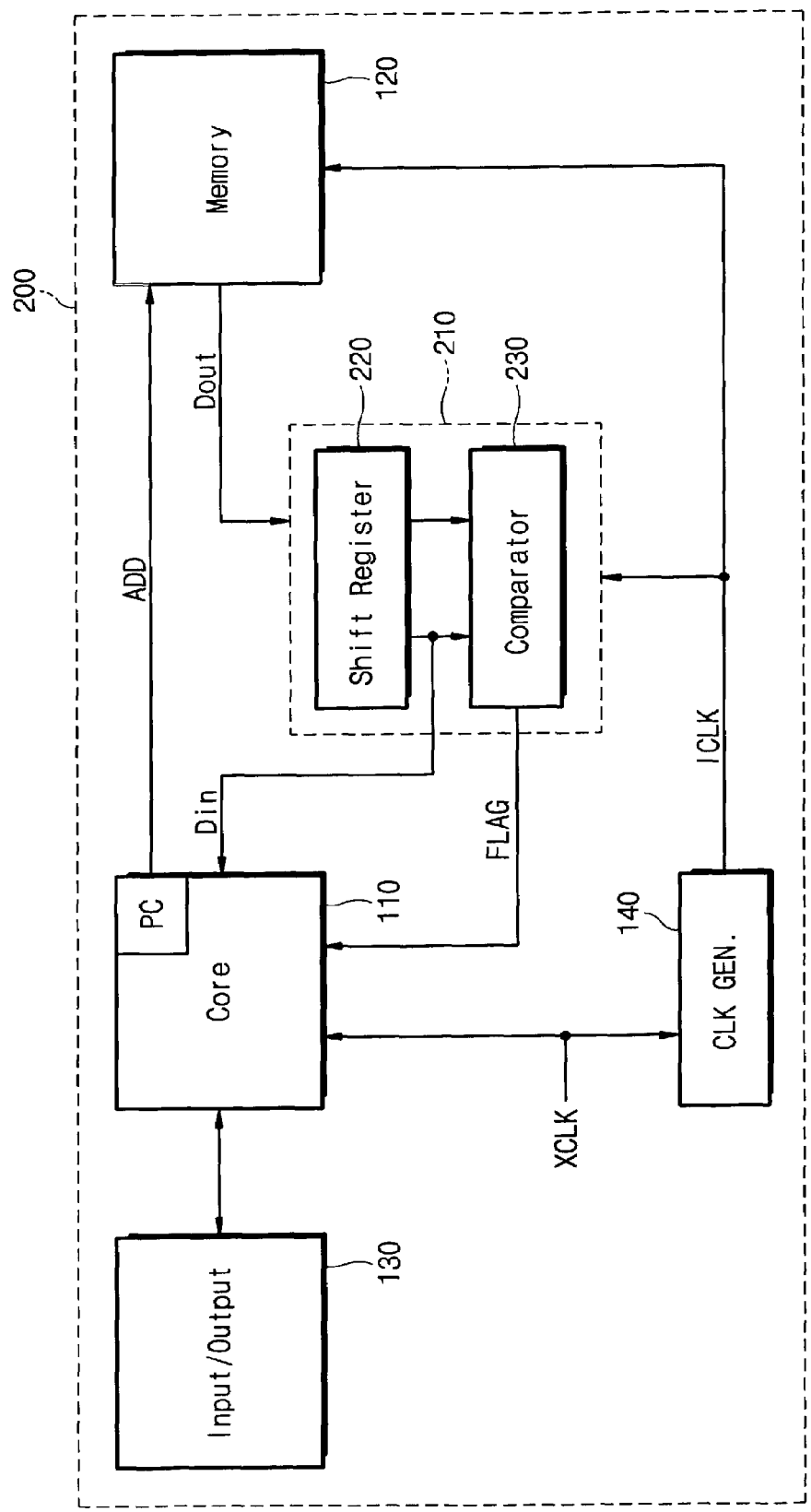
FIG. 4 is a block diagram of a data processing system according to a second embodiment of the present invention.

FIG. 4 is a block diagram of a data processing system according to a second embodiment of the present invention. In FIG. 4, constituent elements identical to those in FIG. 1 are marked with the same reference numerals, and description thereof is thus omitted. The data processing system of the second embodiment is identical to that of the first embodiment except for a tamper-resistant circuit 210. The tamper-resistant circuit 210 according to the second embodiment comprises a shift register 220 and a comparator 230.

The shift register 220 sequentially stores data from a memory 120 in response to an internal clock signal ICLK. The shift register 220 can store data accessed during two cycles of the internal clock signal ICLK. For example, the first data accessed during the first period (a high-level period) of the external clock signal XCLK is stored in the shift register 220, and the second data accessed during the second period (a low-level period) of the external clock signal XCLK is continuously stored in the shift register 220. The first data is shifted by an input of the second data, and then the first data and the second data are simultaneously transferred to the comparator 230. Here, the first data and the second data are accessed by the same address. The comparator 230 compares the first data from the shift register 220 with the second data therefrom, and outputs a flag signal FLAG in response to a comparison result. A core 110 selectively fetches the first data temporarily stored in the shift register 220 in response to the flag signal FLAG.

A read operation of a data processing system according to the second embodiment is identical to that according to the first embodiment, and description thereof is thus omitted. It is obvious that the data processing system according to the second embodiment has the same effects as that according to the first embodiment. In this embodiment, the data processing system comprises a smart card, a microprocessor unit, and so forth.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for preventing tampering of a data processing system including a memory and a processor, comprising the steps of:
    reading out a first data from a region of the memory assigned by an address;
    reading out a second data from the region of the memory assigned by the address;
    determining whether the first data is identical to the second data; and
    fetching by the processor either one of the first and second data when the first data is identical to the second data;
    wherein when the processor operates in synchronization with an external clock signal, the first data and the second data are successively read out from the memory by the same address during one cycle of the external clock signal.

2. The method according to claim 1, wherein when the first data is not identical to the second data, the processor fetches neither of the first and second data.

3. A method for preventing tampering of a data processing system including a memory and a processor, comprising the steps of:
    generating an internal clock signal synchronized with an external clock signal, wherein a period of the external clock signal is N times as long as that of the internal clock signal;
    reading out a first data from a region of the memory assigned by an address in synchronization with the internal clock signal;
    reading out a second data from the region of the memory assigned by the address in synchronization with the internal clock signal;
    determining whether the first data is identical to the second data; and
    loading by the processor either one of the first and the second data when the first data is identical to the second data, wherein the first data and the second data are sequentially read out in synchronization with the internal clock signal within one cycle of the external clock signal.

4. The method according to claim 3, wherein when the first data is not identical to the second data, neither of the first data and the second data is loaded by the processor.

5. The method according to claim 3, further comprising the step of generating a flag signal indicating whether the first and the second data are identical.

6. The method according to claim 5, wherein the loading step is preformed in response to the flag signal.

7. The method according to claim 5, wherein the determining step is performed by a tamper-resistant circuit for receiving the first and second data and comparing data values received.

8. The method according to claim 7, wherein the tamper-resistant circuit comprises first and second buffers; a multiplexer for multiplexing data from the memory into the first and second buffers in response to the internal clock signal; and a comparator for comparing outputs of the first and second buffers to generate the flag signal as a comparison result.

9. The method according to claim 7, wherein the tamper-resistant circuit comprises a shift register for storing first and second data sequentially outputted from the memory in response to the internal clock signal; and a comparator for comparing the first data and the second data from the shift register to generate the flag signal as a comparison result.

10. A data processing system comprising:
a processor core for generating an address in synchronization with a first clock signal;
a clock generating circuit for generating a second clock signal in response to the first clock signal, a period of the first clock signal being N times longer than that of the second clock signal;
a memory operated in synchronization with the second clock signal, for outputting data in response to the address transferred from the processor core; and
a tamper-resistant circuit for receiving data outputted from the memory in response to the second clock signal and comparing data values received during one cycle of the first clock signal,
wherein the processor core loads data from the tamper-resistant circuit when data transferred to the tamper-resistant circuit during a first half period of the first clock signal is identical to data transferred therefrom during a second half period thereof.

11. The data processing system according to claim 10, wherein the tamper-resistant circuit generates a flag signal indicating whether data values received during one cycle of the first clock signal have the same value.

12. The data processing system according to claim 11, wherein the processor core selectively receives data from the tamper-resistant circuit in response to the flag signal.

13. The data processing system according to claim 12, wherein the processor core receives the data from the tamper-resistant circuit in response to the flag signal indicating that data values received during one cycle of the first clock signal are identical to each other.

14. The data processing system according to claim 12, wherein the processor core does not receive the data from the tamper-resistant circuit in response to the flag signal indicating that data values received during one cycle of the first clock signal are different.

15. The data processing system according to claim 11, wherein the tamper-resistant circuit comprises first and second buffers; a multiplexer for multiplexing data from the memory into the first and second buffers in response to the second clock signal; and a comparator for comparing outputs of the first and second buffers to generate the flag signal as a comparison result.

16. The data processing system according to claim 11, wherein the tamper-resistant circuit comprises a shift register for storing first and second data sequentially outputted from the memory during the first and second half periods of the first clock signal; and a comparator for comparing the first data and the second data from the shift register to generate the flag signal as a comparison result.

17. The method according to claim 3, wherein the period of the external clock signal is two times as long as that of the internal clock signal.

18. The data processing system according to claim 15, wherein an output of the first buffer is connected to the processor core.

19. The data processing system according to claim 16, wherein an output of the shift register is connected to the processor core.

* * * * *